(12) United States Patent
Sonoda

(10) Patent No.: US 9,166,512 B2
(45) Date of Patent: Oct. 20, 2015

(54) MOTOR CONTROL DEVICE PROVIDED WITH FEEDFORWARD CONTROL

(71) Applicant: FANUC Corporation, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/323,405

(22) Filed: Jul. 3, 2014

(65) Prior Publication Data

US 2015/0008861 A1  Jan. 8, 2015

(30) Foreign Application Priority Data

Jul. 5, 2013  (JP) .................................. 2013-141739

(51) Int. Cl.
| | |
|---|---|
| *H02P 7/00* | (2006.01) |
| *H02P 23/00* | (2006.01) |
| *H02P 21/14* | (2006.01) |
| *H02P 23/14* | (2006.01) |
| *G05B 13/04* | (2006.01) |

(52) U.S. Cl.
CPC ............ *H02P 23/0045* (2013.01); *G05B 13/04* (2013.01); *H02P 21/148* (2013.01); *H02P 23/14* (2013.01); *G05B 2219/41426* (2013.01)

(58) Field of Classification Search
CPC .......................... H02P 23/0045; B62D 5/0463
USPC ............ 318/400.01, 400.02, 400.07, 400.14, 318/400.15, 400.32, 700, 701, 727, 799, 318/800, 801, 430, 432, 504, 457, 568.22, 318/609, 625; 388/800, 930
See application file for complete search history.

(56) References Cited

U.S. PATENT DOCUMENTS

| | | | | |
|---|---|---|---|---|
| 5,646,495 | A | * | 7/1997 | Toyozawa et al. ............. 318/625 |
| 5,691,615 | A | * | 11/1997 | Kato et al. ..................... 318/609 |
| 7,986,118 | B2 | * | 7/2011 | Yoshikawa ............... 318/568.22 |
| 8,779,712 | B2 | * | 7/2014 | Tanabe et al. .................. 318/432 |

FOREIGN PATENT DOCUMENTS

| | | |
|---|---|---|
| JP | H03-242703 A | 10/1991 |
| JP | H09-319437 A | 12/1997 |
| JP | 2001-022417 A | 1/2001 |
| JP | 2003-323216 A | 11/2003 |
| JP | 2004-280565 A | 10/2004 |
| JP | 2007-257515 A | 10/2007 |
| JP | 2008-171165 A | 7/2008 |

* cited by examiner

*Primary Examiner* — Antony M Paul
(74) *Attorney, Agent, or Firm* — Hauptman Ham, LLP

(57) ABSTRACT

A motor control device for controlling a motor which drives a control target, includes: a speed feedback control unit which generates a pre-correction torque command for controlling such that an actual speed of the control target follows a speed command which is input; an inverse model calculation unit which calculates a coefficient of an inverse model with a transfer function inversed from a transfer function of the control target by using the speed command and the pre-correction torque command; a torque correction value generating unit which generates a torque correction value by using the speed command and the coefficient of the inverse model; and a torque command generating unit which generates a torque command for the motor which drives the control target by using the pre-correction torque command and torque correction value.

4 Claims, 9 Drawing Sheets

SPEED FEEDFORWARD DISABLED

SPEED FEEDFORWARD ENABLED

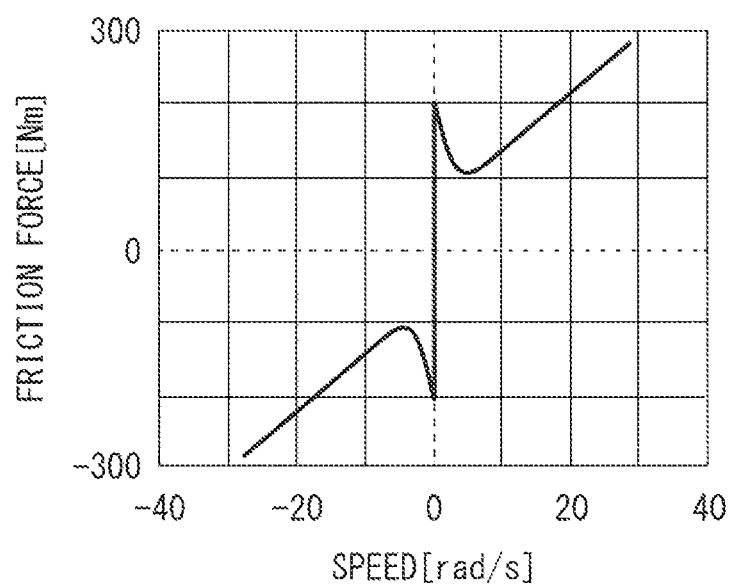

MOTOR CONTROL DEVICE PROVIDED WITH FEEDFORWARD CONTROL

RELATED APPLICATIONS

The present application claims priority to Japanese Application Number 2013-141739, filed Jul. 5, 2013, the disclosure of which is hereby incorporated by reference herein in its entirety.

BACKGROUND OF THE INVENTION

1. Field of the Invention

The present invention relates to a motor control device for controlling a motor which is used as a driving source of a machine such as a robot, machine tool, or industrial machine.

2. Description of the Related Art

A motor control device for controlling a motor which is used as a driving source of a machine such as a robot, machine tool, or industrial machine is provided with a feedback control in order that a control target such as a rotary driven motor alone, or a machine cooperating with a motor as a driving source (including attachments such as a workpiece on which the machine acts in some cases) (hereinafter, simply referred to as "control target") is operated in accordance with a command. Examples of the feedback control include a speed feedback control in which a speed of a control target follows a speed command and a position feedback control in which a position of a control target follows a position command.

It is known that a feed-forward control is provided in addition to a feedback control for attaining higher responsiveness to a command. Examples of the feed-forward control for a command include a speed feed-forward control which is added to a speed feedback control in order to increase the responsiveness to a speed command and a position feed-forward control which is added to a position feedback control in order to increase the responsiveness to a position command.

FIG. 9 is block diagram illustrating a conventional general motor control device with a feedback control and feed-forward control. Hereinafter, components indicated by the same reference number are components having the same function. A case in which a motor control device 100 controls the operation of a control target 200 will be described.

As mentioned above, examples of the control target 200 include a motor alone, and a motor and a machine cooperating with the motor as a driving source (including attachments such as a workpiece on which the machine acts in some cases). For example, it is assumed that a motor torque constant of the control target 200 is set to $K_t$, a motor inertia to J, and a friction coefficient to C. The differential operator is represented by s. A transfer function of the control target 200 is represented by "$K_t/(Js+C)$".

A controller 101 carries out a speed feedback control in which an actual speed of the control target 200 follows a speed command. An error between a speed fed back from the control target 200 and the speed command is input to the controller 101, and the controller 101 outputs a torque command. The controller 101 is realized by a PI control or a PID control. For example, when the controller 101 is realized by a PI control as illustrated in FIG. 9, setting the integral gain to $K_1$ and the proportional gain to $K_2$, the transfer function of the controller 101 is represented by "$K_1/s+K_2$".

The transfer function of a speed feed-forward (VFF) control block 104 is set to "$(Js+C)/K_t$" which is an inverse function of the transfer function of the control target 200 "$K_t/(Js+C)$" in order to realize a highly responsive control to a speed command. Here, when the controller 101, speed feed-forward control block 104 and control target 200 are considered as one system (hereinafter, referred to as "speed control system"), an input of the speed control system can be regarded as a "speed command" and an output of the speed control system can be regarded as an "actual speed of the control target 200" fed back from the control target 200. When the transfer function of the speed feed-forward control block 104 is designed to be the inverse function (inverse model in the case of nonlinear) of the transfer function of the control target 200, the transfer function of the speed control system is "1", thereby realizing a high responsiveness to a speed command.

In an example illustrated in FIG. 9, a position gain of a position gain block 102 of a position feedback control in which the position of the control target 200 follows a position command is set to $K_p$. The error between a position obtained by integrating the speed of the control target 200 in an integration block 103 and the position command is multiplied by a position gain Kp to be used as a part of the above-mentioned speed command. The transfer function of the integration block 103 is represented by "1/s".

When the speed control system whose transfer function is "1", the position gain 102, the integral gain block 103 whose transfer function is "1/s", and a position feed-forward (PFF) block 105 are considered as one system (hereinafter, referred to as a "position control system"), an input of the position control system can be regarded as a "position command", and the output of the position control system can be regarded as "the actual position of the control target 200" fed back from the control target 200. As mentioned above, since the transfer function of the speed control system comprising the controller 101, the speed feed-forward control block 104 and the control target 200 is "1", when the transfer function of the position feed-forward control block 105 is designed to an inverse function "s" of the transfer function "1/s" of the integral gain block 103, the transfer function of the position control system is also "1", thereby realizing a high responsiveness to the position control system.

When the transfer function of the speed control system can be set to "1" as mentioned above, the design of the position feed-forward control block 105 is facilitated since the transfer function of the position feed-forward control block 105 can be designed to be the inverse function "s" of the transfer function "1/s" of the integral gain block 103. The design of the speed feed-forward control block 104 and the position feed-forward control block 105 of the motor control device 100 thus needs detail information on a variety of constants of the control target 200.

In general, it may be difficult to grasp a variety of constants such as inertia and friction of a control target in a machine such as a robot, machine tool, or industrial machine. For example, as for an attachment which is attached to a machine in a robot or an industrial machine, or as for an object to be processed in a machine tool, when the size or the weight thereof fluctuates, the inertia or friction thereof fluctuates. A parameter such as a parameter for the friction of a machine changes also due to secular change. The parameter such as a parameter for a friction fluctuates also depending on the position of a driven body driven by a motor. Further, inertia also fluctuates depending on the position of a driven body.

As mentioned above, a method is conventionally known in which a parameter of feed-forward control is determined by using adaptive control in order to realize a high responsiveness even when a variety of constants of a control target are unknown or uncertain.

For example, Japanese Laid-open Patent Publication No. H3-242703 discloses a method in which in an electric motor which drives a robot arm, a parameter of a position feed-forward control is adaptively determined by using a steepest descent method algorithm so that the position error becomes small in order to realize high command responsiveness even when inertia largely fluctuates since the inertia largely fluctuates in accordance with the movement of the arm.

As another example, Japanese Laid-open Patent Publication No. 2008-171165 discloses a method in which an optimum torque command is output corresponding to a control target including a load which fluctuates depending on a rotation angle by adaptively identifying a torque offset due to the effect of inertia and a gravity with respect to a control target and by carrying out feed-forward control by correcting a torque command using the torque offset.

As mentioned above, when the transfer function of a speed feed-forward control of a motor control device is designed to be the inverse model of a control target, a high responsiveness to a speed command can be realized. When the transfer function of the speed feed-forward control can be optimally designed, a position feed-forward control having a high responsiveness can be relatively easily designed. It is therefore very important to accurately grasp detailed information about a variety of constants of a control target when a speed feed-forward control is designed.

However, when a feed-forward control of a motor control device is designed, in cases in which a variety of constants of a control target are not accurately grasped for some reasons, the completed feed-forward control is not necessarily said to be an optimal one and it is not necessarily said that a high responsiveness to a command is realized.

In particular, in cases in which a control target which a motor control device drives is one whose inertia and friction fluctuate, it is very difficult to obtain detailed information about a variety of constants of a control target and it is also difficult to increase the responsiveness to a command of the motor control device.

For example, in the inventions disclosed in Japanese Laid-open Patent Publication No. H3-242703 and Japanese Laid-open Patent Publication No. 2008-171165, although a parameter relating to inertia of a control target is determined using adaptive control to carry out a feed-forward control, a parameter relating to a friction of the control target is not considered. The inventions described in Japanese Laid-open Patent Publication No. H3-242703 and Japanese Laid-open Patent Publication No. 2008-171165 thus have a problem that, although a control target whose inertia fluctuates can be dealt with, an optimum feed-forward control cannot be carried out for a control target whose friction fluctuates.

SUMMARY OF THE INVENTION

An object of the present invention is to provide a motor control device provided with a feed-forward control having a high responsiveness to a command, which can be easily designed optimally without grasping a variety of constants of a control target in detail.

Another object of the present invention is to provide a motor control device provided with a feed-forward control having a high responsiveness to a command even when inertia and friction of a control target fluctuate.

A motor control device for controlling a motor which drives a control target includes: a speed feedback control unit which generates a pre-correction torque command for controlling such that an actual speed of the control target follows a speed command which is input; an inverse model calculation unit which calculates a coefficient of an inverse model with a transfer function inversed from a transfer function of the control target by using the speed command and the pre-correction torque command; a torque correction value generating unit which generates a torque correction value by using the speed command and the coefficient of the inverse model; and a torque command generating unit which generates a torque command for the motor which drives the control target by using the pre-correction torque command and torque correction value.

The inverse model calculation unit may include: a coefficient correction value calculation unit which calculates a coefficient correction value by using the speed command, the pre-correction torque command, and a predetermined adaptive coefficient; an inertia coefficient estimation value calculation unit which calculates, by using the coefficient correction value and an inertia coefficient estimation value, a new inertia coefficient estimation value; a viscous friction coefficient estimation value calculation unit which calculates, by using the coefficient correction value and a viscous friction coefficient estimation value, a new viscous friction coefficient estimation value; and a Coulomb friction coefficient estimation value calculation unit which calculates, by using the coefficient correction value and a Coulomb friction coefficient estimation value, a new Coulomb friction coefficient estimation value, wherein a coefficient of an inverse model may be calculated for each sampling period by using the new inertia coefficient estimation value, the new viscous friction coefficient estimation value, and the new Coulomb friction coefficient estimation value.

When an absolute value of the speed command is smaller than a predetermined value, the inverse model calculation unit may maintain a coefficient of the inverse model calculated in a sampling period before a sampling period in which the speed command is input, and may output the coefficient to a torque correction value generating unit when the absolute value of a speed command is smaller than a predetermined value.

The torque correction value generating unit may generate the torque correction value by adding: a product of an acceleration calculated from the speed command and an inertia coefficient estimation value used for an estimation of an inertia of the control target; a product of a speed command and a viscous friction coefficient estimation value used for an estimation of a viscous friction coefficient of the control target; and a product of a polarity of a speed command and a Coulomb friction coefficient estimation value used for an estimation of a Coulomb friction coefficient of the control target.

BRIEF DESCRIPTION OF DRAWINGS

The invention will be more clearly understood with reference to the accompanying drawings.

FIG. 6 is a diagram illustrating the Stribeck effect which is caused by a nonlinear friction of a control target of the motor control device.

DETAILED DESCRIPTION

In the following, a motor control device provided with feed-forward control will be described with reference to drawings. It should be understood however that the present invention is not limited to the drawings and the embodiments described below.

Examples of a control target driven by the motor control device include a motor, one including the motor and a machine cooperating with the motor as a driving source, or one including the machine and an attachment such as a workpiece on which the machine acts. Accordingly, when a "control target" in the following description is read by replacing with the above, it will be understood that the invention can be applied to a variety of applications. Examples of the machine cooperating with the motor driven by the motor control device include a robot, machine tool, or industrial machine. A speed command, torque command, position command, pre-correction torque command, and pre-correction speed command are defined by the magnitude (scalar) and the polarity (vector).

Figure 1:
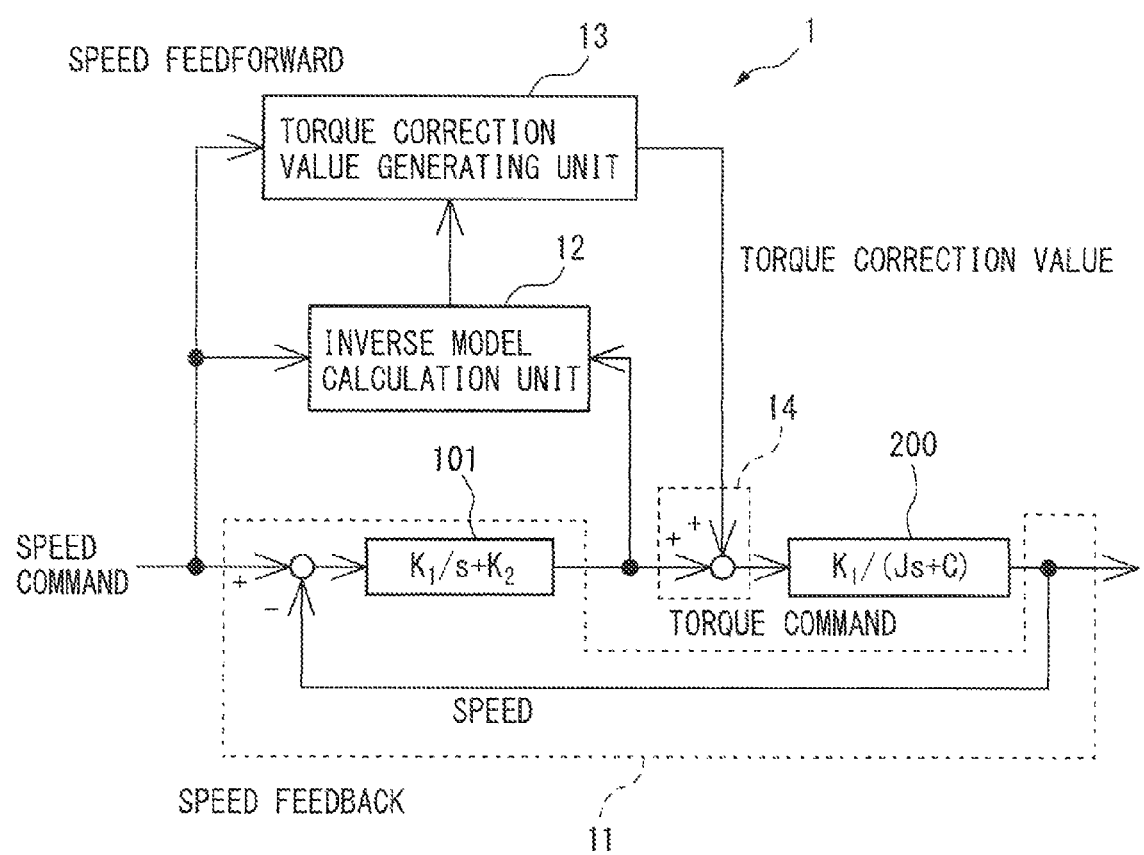
FIG. 1 is a block diagram illustrating a motor control device according to a first Example.

FIG. 1 is a block diagram illustrating a motor control device according to a first Example. According to the first Example, a motor control device 1 for controlling a motor which drives a control target 200 comprises a speed feedback control unit 11, an inverse model calculation unit 12, a torque correction value generating unit 13, and a torque command generating unit 14. In the illustrated example, by representing a motor torque constant of the control target 200 to $K_t$, a motor inertia to J, a friction coefficient to C, and a differential operator to s, the transfer function of the control target 200 is represented by "$K_t/(Js+C)$". Since the gravity causing an effect on the control target 200 also has a nonlinear characteristic, the transfer function of the control target 200 may be one in which an effect of the gravity is taken into consideration.

The speed feedback control unit 11 generates a pre-correction torque command for controlling such that the actual speed of the control target 200 follows an input speed command. More specifically, an error between an actual speed fed back from the control target 200 and the speed command is input to a controller 101 contained in the speed feedback control unit 11, and a speed feedback control in which the actual speed of the control target 200 follows the speed command is carried out by generating and outputting the pre-correction torque command. The controller 101 is realized by PI control or PID control, and when it is realized by PI control, the transfer function of the controller 101 is represented by "K1/s+K2", setting an integral gain to K1 and a proportional gain to K2.

The inverse model calculation unit 12 calculates the coefficient of the inverse model of the transfer function which the control target 200 has by using a speed command and the pre-correction torque command. The detail of the inverse model will be described below.

The torque correction value generating unit 13 generates a torque correction value by using a speed command and the coefficient of the inverse model calculated by the inverse model calculation unit 12. The detail of the torque correction value will be described below.

The torque command generating unit 14 generates a torque command for a motor which drives the control target 200 by using the pre-correction torque command and the torque correction value. The generated torque command is used for controlling a power converter (not illustrated) which outputs a driving power of a motor. For example, in cases in which the power converter is constituted by a PWM inverter which converts DC power to AC power by a switching operation of a semiconductor switching element provided therein, a PWM switching signal for controlling a switching operation of a semiconductor switching element in the PWM inverter is generated in accordance with the generated torque command. The PWM inverter performs a switching operation of the semiconductor switching element therein in accordance with a received PWM switching signal and converts DC power to AC power to output to a motor. Since the motor operates using AC power output from the power converter as a driving power, if the AC power output from the power converter is controlled, the motor can be operated at a desired speed, torque, or a position of a rotor in the motor, and as the result, a machine such as a robot, machine tool, or an industrial machine containing the motor as a driving source can be operated.

Next, each operation of an inverse model generating unit 12 which generates an inverse model, a torque correction value generating unit 13, and a torque command generating unit 14 which generates a torque command will be described.

The inverse model generating unit 12 estimates coefficients of an inverse model of the transfer function of the control target 200 including the inertia and friction. In the present Example, a friction having a nonlinear characteristic represented by a Coulomb friction is taken as an example. A friction C in the transfer function "$K_t/(Js+C)$" of the control target 200 illustrated in FIG. 1 is thus represented by the Formula 1. In the Formula 1, $\omega(t)$ represents the speed of a motor, $C_1$ a viscous friction coefficient, and $C_2$ a Coulomb friction coefficient. The "sign ( )" is a signum function for a function in the "( )", and, in other words, "sign($\omega(t)$)" represents the polarity of the speed $\omega(t)$ of a motor.

$$C(t) = C_1 \cdot \omega(t) + C_2 \cdot \text{sign}(\omega(t)) \tag{1}$$

The inverse model of the control target 200 which is a single inertial system containing a nonlinear friction is defined as the Formula 2. Assuming that the speed feedback control and speed feed-forward control are digitally controlled in a predetermined sampling period in an actual device, the Formula 2 is represented by a discrete system. In the Formula 2, i(n) represents an inverse model, $\omega(n)$ the speed of a motor, J the inertia of the control target 200, $K_t$ a motor torque constant of the control target 200, T a sampling period, and n the number of sampling data in one sampling period.

$$i(n) = \frac{J}{K_t \cdot T} \cdot (\omega(n) - \omega(n-1)) + \frac{C_1}{K_t} \cdot \omega(n) + \frac{C_2}{K_t} \cdot \text{sign}(\omega(n)) \tag{2}$$

An inverse model defined by the Formula 2 is used for a speed feed-forward control. In other words, in accordance with the inverse model defined by the Formula 2, the torque correction value generating unit 13 generates a torque correction value. Specifically, the inverse model calculation unit 12 (an identification device) estimates a coefficient of the inverse model defined by the Formula 2 sequentially by using a pre-correction torque command which is an output of a controller 101 contained in the speed feedback control unit 11 and a speed command. The torque command correction value generating unit 13 generates a torque correction value by using the speed command and the coefficient of the inverse model estimated in the inverse model calculation unit 12. Further, the torque command generating unit 14 corrects the pre-correction torque command output from the controller 101 by using the torque correction value generated by the torque command correction value generating unit 13, and generates a torque command for a motor which drives the control target 200. Since, in such a manner, torque correction values are sequentially generated by the torque correction value generating unit 13 corresponding to the coefficients of the inverse model which are sequentially estimated by the inverse model calculation unit 12 and pre-correction torque command which is an output of the controller 101 is sequentially corrected by using the torque correction values, a speed feed-forward control which can deal with fluctuation of the inertia and friction of the control target 200 is realized.

The Formula 2 which is the definition formula of the inverse model is simplified to the Formula 3 to be used for generation processing of a torque correction value by the torque correction value generating unit 13. In the Formula 3, $i_{ff}(n)$ represents a torque correction value, $\omega(n)$ a speed command, J inertia of the control target 200, Kt a motor torque constant of the control target 200, T a sampling period, n the number of sampling data in one sampling period, C1 a viscous friction coefficient of the control target 200, and C2 a Coulomb friction coefficient of the control target 200. The "sign( )" is a signum function for a function in the "( )", and, in other words, "sign($\omega(n)$)" represents the polarity of the speed command $\omega(n)$ of a motor.

$$i_{ff}(n) = h_o \cdot V_0(n) + h_1 = V_1(n) + h_2 \cdot V_2(n) \quad (3)$$

where $h_0 = J/(K_t \cdot T)$, $h_1 = C_1/K_t$, $h_2 = C_2/K_t$,
$V_0 = \omega(n) - \omega(n-1)$, $V_1 = \omega(n)$, $V_2 = \text{sign}(\omega(n))$ As seen from the Formula 3, the torque correction value generating unit 13 generates the torque correction value $i_{ff}(n)$ by adding: a product $v_{10} \cdot h_0$ of an acceleration $v_0(=\omega(n)-\omega(n-1))$ calculated by the speed command $\omega(n)$ and an inertia coefficient estimation value $h_0$ which is used for estimating inertia J of the control target 200; a product $v_1 \cdot h_1$ of a speed command $v_1(=\omega(n))$ and a viscous friction coefficient estimation value $h_1$ which is used for estimating viscous friction coefficient $C_1$ of the control target 200; and a product $v_2 \cdot h_2$ of the polarity $v_2(=\text{sign}(\omega(n)))$ of the speed command and a Coulomb friction coefficient estimation value $h_2$ which is used for estimating a Coulomb friction coefficient $C_2$ of the control target 200.

The torque correction value $i_{ff}(n)$ presented in the Formula 3 is used for correcting a pre-correction torque command which the controller 101 outputs. Specifically, the torque command generating unit 14 generates a torque command for a motor which drives the control target 200 by adding the pre-correction torque command output from the controller 101 and the torque correction value generated by the torque command correction value generating unit 13. Here, in cases in which the torque correction value is an optimal value, the error between the speed command and the actual speed is zero (0), and thus, the pre-correction torque command output from the controller 101 is zero (0). In such cases, the torque correction value is therefore the torque command per se.

Subsequently, an estimation algorithm of a coefficient of an inverse model using the inverse model calculation unit 12 will be described. In the first Example, a sequential least-squares method having an excellent stability or estimate speed is used as the estimation algorithm of a coefficient of an inverse model. A steepest descent method may be used as the estimation algorithm for an alternative example.

The estimation formula which is used when an inertia coefficient estimation value $h_0$, a viscous friction coefficient estimation value $h_1$, and a Coulomb friction coefficient estimation value $h_3$ are estimated from n pieces of sampling data by using a least-squares method is as per the Formula 4. In the Formula 4, in the present Example, $h_0$, $h_1$ and $h_3$ are used, and thus m=3.

$$i = Vh + e \quad (4)$$

i: n-torque correction value vector, h: m-order coefficient vector of inverse model, V: n×m speed command matrix, e: n-error vector The error vector in the Formula 4 means a pre-correction torque command which is an output from the controller 101. An evaluation function of the error vector is defined as the Formula 5. In the Formula 5, a matrix above which "T" is written means a transposed matrix.

$$S(h) = e^T e = (i - Vh)^T (i - Vh) \quad (5)$$

Since the purpose of the error vector is be a zero vector, a necessary condition for the evaluation function to be minimum is the Formula 6.

$$\frac{\partial S}{\partial h} = -2V^T (i - Vh) = 0 \quad (6)$$

The Formula 6 is rearranged to obtain the Formula 7 as the estimation formula of the least-squares method.

$$h_f = (V^T V)^{-1} V^T i \quad (7)$$

When an observation value is defined to be at point N in time for converting to a sequential least-squares method, the Formula 7 can be converted to the Formula 8.

$$h_f (V_N^T V_N)^{-1} V_N^T i_N \quad (8)$$

In order to convert to a sequential least-squares method, the following the Formula 9 is defined.

$$P_N = (V_N^T V_N)^{-1}$$

$$P_N^{-1} = P_{N-1}^{-1} + v_N v_N^T \quad (9)$$

where $v_N$ is m-order vector of matrix V at N point in time

By substituting the Formula 9 into the Formula 8, a recurrence formula presented in the Formula 10 is obtained.

$$\hat{h}_N = \hat{h}_{N-1} + P_N v_N (i_N - v_N^T \hat{h}_{N-1}) \quad (10)$$

In order to avoid calculation of an inverse matrix in the Formula 10, a matrix inversion lemma is applied to the Formula 10 to obtain the Formula 11.

$$P_N = P_{N-1} + \frac{P_{N-1} v_N v_N^T P_{N-1}}{1 + v_N^T P_{N-1} v_N} \quad (11)$$

The initial value of the Formula 11 is presented in the Formula 12 by using a unit matrix and an adaptive coefficient α. In the Formula 12, the adaptive coefficient α is appropriately set depending on the state of the motor control device 1 applied.

$$P_0 = \alpha I \quad (12)$$

The inverse model calculation unit 12 calculates a coefficient of an inverse model presented in the Formula 3 by calculating a recurrence formula of the Formula 10 by using the Formula 11 and the Formula 12.

Figure 2:
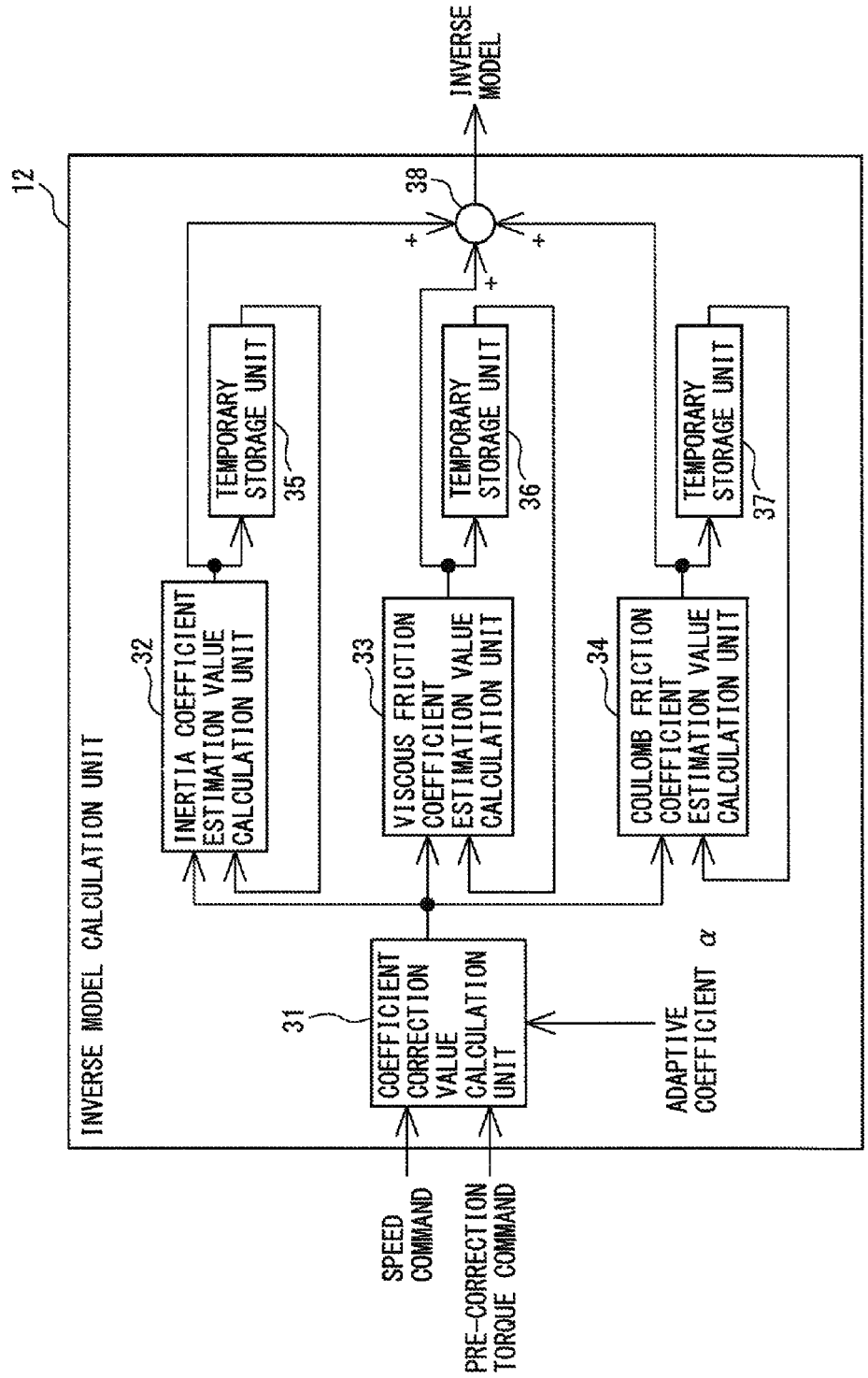
FIG. 2 is a block diagram illustrating an inverse model calculation unit in the motor control device according to the first Example.

FIG. 2 is a block diagram illustrating an inverse model calculation unit in a motor control device in the first Example.

The inverse model calculation unit 12 which calculates the coefficient of an inverse model comprises a coefficient correction value calculation unit 31, an inertia coefficient estimation value calculation unit 32, a viscous friction coefficient estimation value calculation unit 33, and a Coulomb friction coefficient estimation value calculation unit 34.

The coefficient correction value calculation unit 31 calculates a coefficient correction value by using a speed command input for each sampling period, a pre-correction torque command generated in a sampling period before a sampling period in which the speed command is input, and a predetermined adaptive coefficient α.

The inertia coefficient estimation value calculation unit 32 calculates a new inertia coefficient estimation value by using a coefficient correction value which is calculated by the coefficient correction value calculation unit 31 and an inertia coefficient estimation value which has been calculated in a sampling period before a sampling period in which the coefficient correction value is calculated and stored in a temporary storage unit 35. The new inertia coefficient estimation value calculated by the inertia coefficient estimation value calculation unit 32 is output to an adder 38, and at the same time stored in the temporary storage unit 35 for use in a calculation processing by the inertia coefficient estimation value calculation unit 32 in the next sampling period.

The viscous friction coefficient estimation value calculation unit 33 calculates a new viscous friction coefficient estimation value by using a coefficient correction value which is calculated by the coefficient correction value calculation unit 31 and a viscous friction coefficient estimation value which has been calculated in a sampling period before a sampling period in which the coefficient correction value is calculated and stored in a temporary storage unit 36. The new viscous friction coefficient estimation value calculated by the viscous friction coefficient estimation value calculation unit 33 is output to the adder 38, and at the same time stored in the temporary storage unit 36 for use in a calculation processing by the viscous friction coefficient estimation value calculation unit 33 in the next sampling period.

The Coulomb friction coefficient estimation value calculation unit 34 calculates a new Coulomb friction coefficient estimation value by using a coefficient correction value which is calculated by the coefficient correction value calculation unit 31 and a Coulomb friction coefficient estimation value which has been calculated in a sampling period before a sampling period in which the coefficient correction value is calculated and stored in a temporary storage unit 37. The new Coulomb friction coefficient estimation value calculated by the Coulomb friction coefficient estimation value calculation unit 34 is output to the adder 38, and at the same time stored in the temporary storage unit 37 for use in a calculation processing by the Coulomb friction coefficient estimation value calculation unit 34 in the next sampling period.

By adding the above-described new inertia coefficient estimation value, the above-described new viscous friction coefficient estimation value, and the above-described new Coulomb friction coefficient estimation value by the adder 38, an inverse model is generated. The generated coefficient of the inverse model is output to the torque correction value generating unit 13. On the other hand, the inertia coefficient estimation value stored in the temporary storage unit 35, the viscous friction coefficient estimation value stored in the temporary storage unit 36, and the Coulomb friction coefficient estimation value stored in the temporary storage unit 37 are used for calculating an inverse model in the next sampling period.

The process by each of the above-described units 31 to 38 is carried out for each sampling period.

Figure 3:
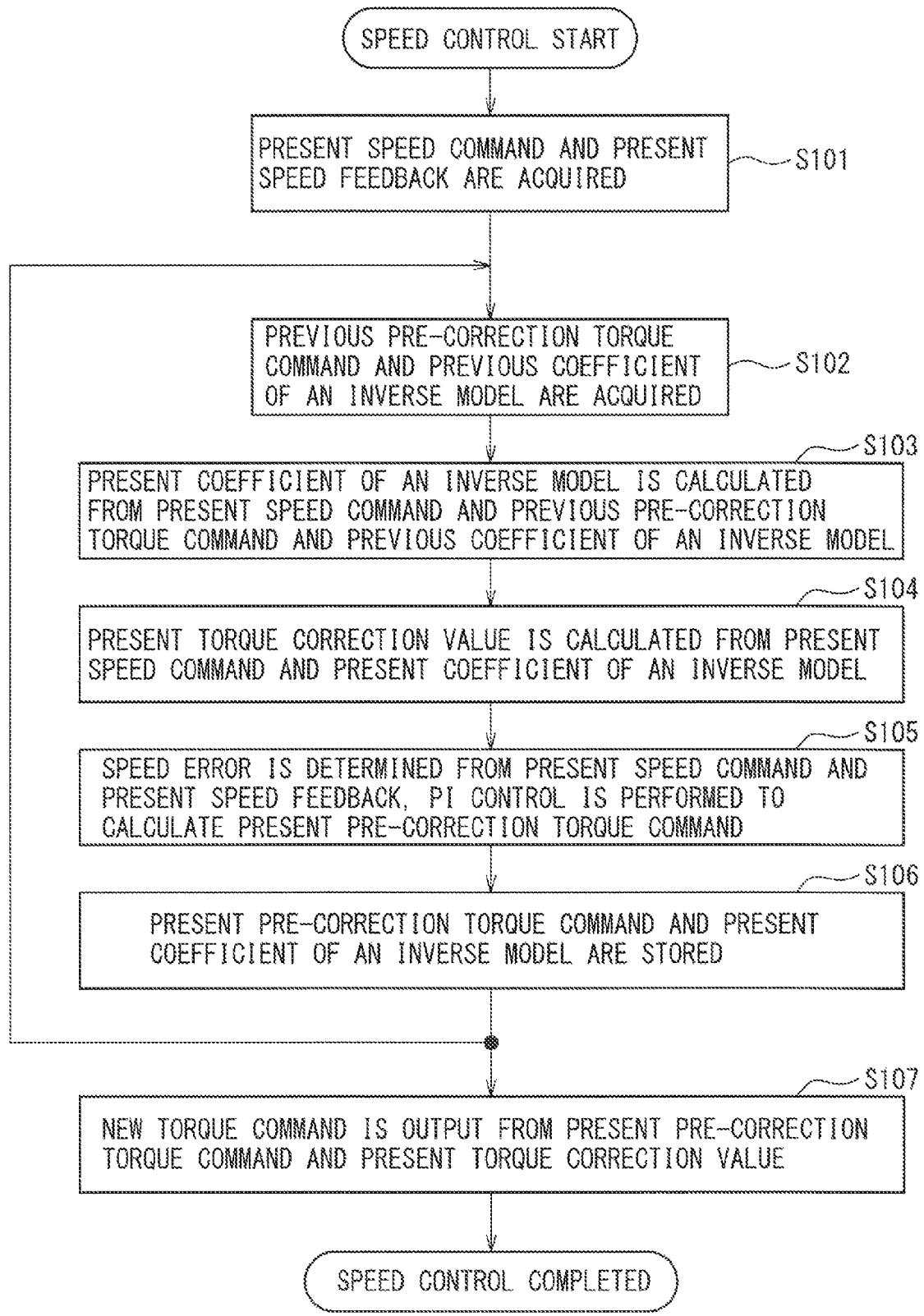
FIG. 3 is a flowchart illustrating an operational flow of the motor control device according to the first Example.

FIG. 3 is a flowchart illustrating an operational flow of the motor control device according to the first Example. Each process of the steps S101 to S107 is carried out for each sampling period. The order in which the processes of the steps S101 to S107 are carried out is one example, and these processes may be carried out by changing the order thereof appropriately without causing any contradiction.

First, in the step S101, the motor control device 1 acquires a speed command in a present sampling period and an actual speed fed back from the control target 200.

Next, in the step S102, the inverse model calculation unit 12 acquires a pre-correction torque command and a coefficient of an inverse model in a previous sampling period. More specifically, the coefficient correction value calculation unit 31 in the inverse model calculation unit 12 acquires a pre-correction torque command in a previous sampling period. Each of the inertia coefficient estimation value calculation unit 32 in the inverse model calculation unit 12, the viscous friction coefficient estimation value calculation unit 33, and the Coulomb friction coefficient estimation value calculation unit 34 acquires a coefficient (i.e. a coefficient stored in each of the temporary storage units 35 to 37) of an inverse model in a previous sampling period.

Next, in the step S103, the inverse model calculation unit 12 calculates a new coefficient of an inverse model from a speed command in a present sampling period and a pre-correction torque and a coefficient of an inverse model in a previous sampling period. More specifically, the coefficient correction value calculation unit 31 calculates a coefficient correction value by using a speed command in a present sampling period, a pre-correction torque command in a previous sampling period, and a predetermined adaptive coefficient α. The inertia coefficient estimation value calculation unit 32 calculates a new inertia coefficient estimation value by using a coefficient correction value calculated by the coefficient correction value calculation unit 31 and an inertia coefficient estimation value in a previous sampling period. The viscous friction coefficient estimation value calculation unit 33 calculates a new viscous friction coefficient estimation value by using a coefficient correction value calculated by the coefficient correction value calculation unit 31 and a viscous friction coefficient estimation value in a previous sampling period. The Coulomb friction coefficient estimation value calculation unit 34 calculates a new Coulomb friction coefficient estimation value by using a coefficient correction value calculated by the coefficient correction value calculation unit 31 and a Coulomb friction coefficient estimation value in a previous sampling period.

Next, in the step S104, the torque correction value generating unit 13 calculates a torque correction value from a speed command in a present sampling period and a coefficient of an inverse model calculated by the inverse model calculation unit 12.

On the other hand, in the step S105, the controller 101 in the speed feedback control unit 11 carries out PI control on a speed command in a present sampling period acquired in the step S101 and the error between the speed command and an actual speed fed back from the control target 200 to output a pre-correction torque command. Although in the first Example, as one example, PI control is used for the speed feedback control, PID control, for example, may also be used.

In the step S106, a pre-correction torque command and a coefficient of an inverse model in a present sampling period are stored in each storage unit for use in calculation of an inverse model in the next sampling period. More specifically, an inertia coefficient estimation value calculated in a present sampling period is stored in the temporary storage unit 35; a viscous friction coefficient estimation value calculated in a present sampling period is stored in the temporary storage unit 36; and a Coulomb friction coefficient estimation value calculated in a present sampling period is stored in the temporary storage unit 37. Likewise, a pre-correction torque command calculated in a present sampling period is also stored in a predetermined temporary storage unit in the motor control device 1. Each of the data stored in the storage units is read out again by a process in the step S102 in the next sampling period and utilized for processes in the step S103 and thereafter.

In the step S107, the torque command generating unit 14 generates a new torque command for a motor which drives the control target 200 by adding a pre-correction torque command output from the controller 101 in a present sampling period and a torque correction value generated from the torque command correction value generating unit 13.

As described above, according to the first Example, the inverse model calculation unit 12 (identification device) sequentially estimates a coefficient of an inverse model in consideration of the inertia, viscous friction, and Coulomb friction based on the above-described recurrence formula by using a pre-correction torque command which is an output of a controller 101 contained in the speed feedback control unit 11 and a speed command, and the torque command correction value generating unit 13 generates a torque correction value by using a speed command and a coefficient of an inverse model estimated in the inverse model calculation unit 12. When an estimated inverse model is finally optimized for the inverse model of the transfer function of the control target 200, the transfer function of a speed control system comprising the controller 101, the speed feed-forward control block 104, and the control target 200 is "1", thereby realizing a high responsiveness to the speed command. Since the coefficient estimated in the inverse model calculation unit 12 (identification device) is utilized for a coefficient for speed feed-forward as it is, and the transfer function of a speed feed-forward control is sequentially changed depending on an inverse model which is sequentially estimated, a high responsiveness to a command can be attained even when the inertia and friction of the control target 200 fluctuate. Since the inverse model is calculated in accordance with the above-described recurrence formula by setting an initial value to the adaptive coefficient α, a feed-forward control with high responsiveness to a command can be easily optimally designed without grasping a variety of constants of the control target 200 in detail.

Figure 4:
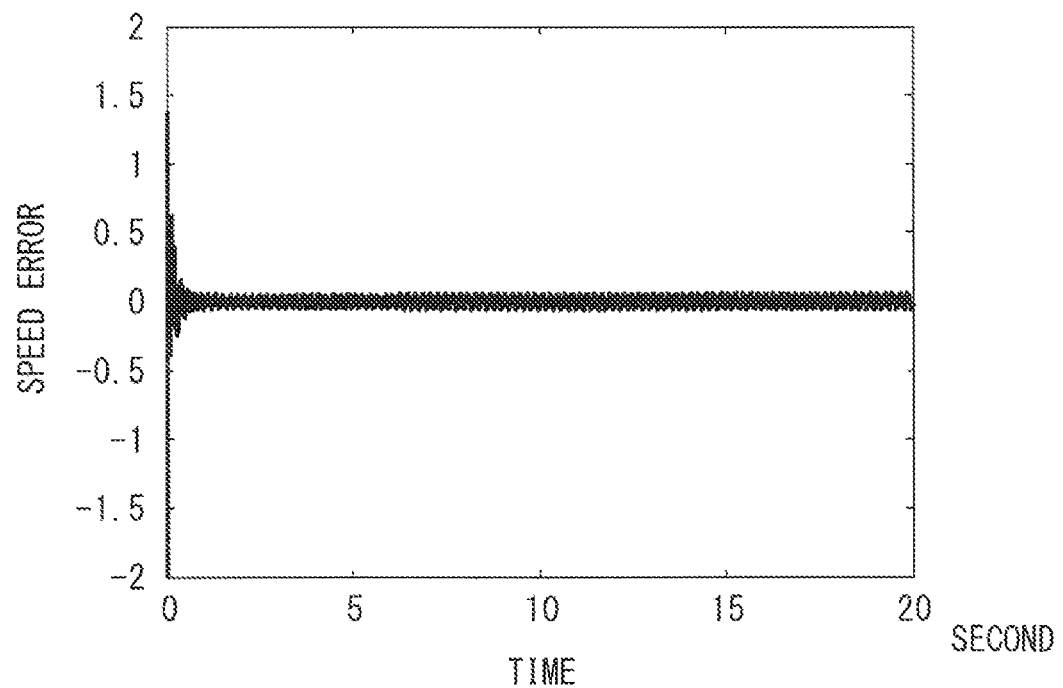
FIG. 4 is a diagram illustrating a simulation result (#1) of the motor control device according to the first Example.

FIG. 4 is a diagram illustrating a simulation result (#1) of a motor control device according to the first Example. The above-described motor control device according to the first Example was modeled on a computer, and a 5 Hz sinusoidal speed command input was started at 0 seconds to simulate the error between the speed command and the actual speed thereafter. As illustrated, after inputting the speed command at 0 seconds, the error between the speed command and the actual speed gradually decreased with the passage of time, and the speed error was converged at a time when about one second passed. From the simulation result, it is found that a speed feed-forward control using an inverse model in the first Example is effective.

Figure 5A:
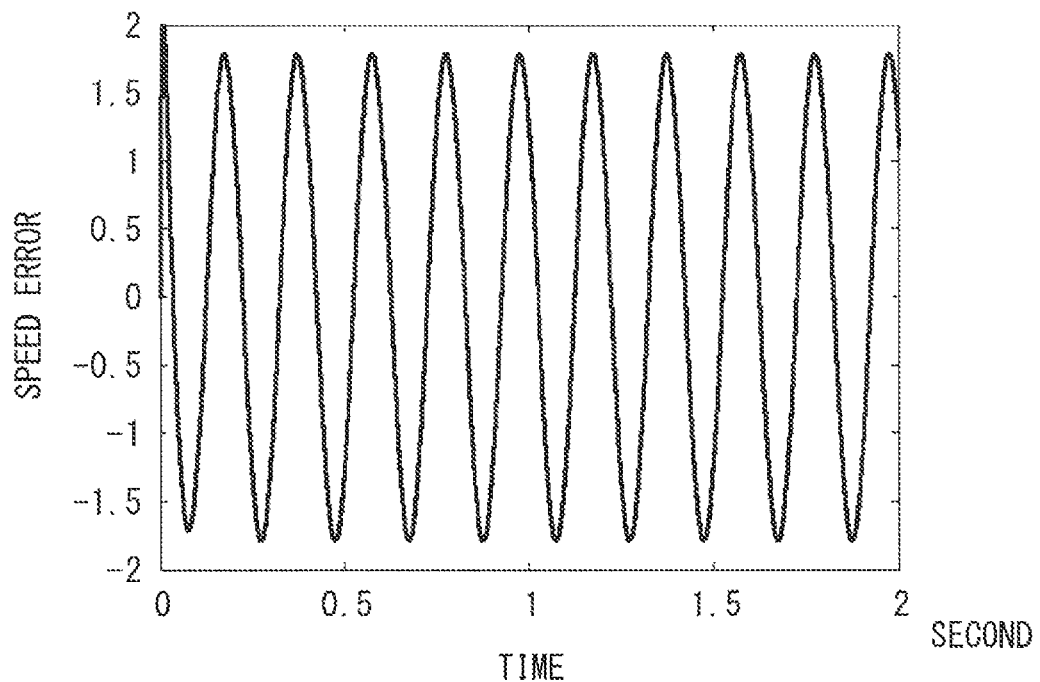
FIG. 5A is a diagram illustrating a simulation result (#2) of the motor control device of the first Example in which a speed feed-forward control using an inverse model is disabled.
Figure 5B:
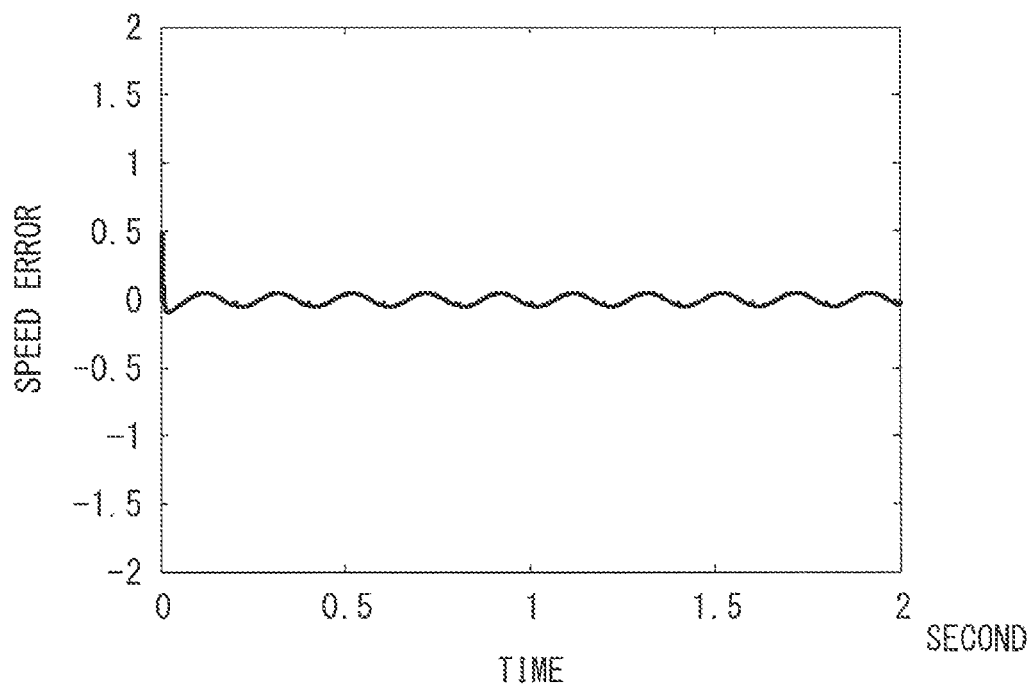
FIG. 5B is a diagram illustrating a simulation result (#2) of the motor control device of the first Example in which a speed feed-forward control using an inverse model is functioned.

FIG. 5A and FIG. 5B are diagrams illustrating simulation results (#2) of a motor control device according to the first Example. FIG. 5A is the case in which a speed feed-forward control using an inverse model is disabled, and FIG. 5B is the case in which a speed feed-forward control using an inverse model is functioned. The above-described motor control device according to the first Example was modeled on a computer, and the error between a speed command and the actual speed was simulated by providing a 5 Hz sinusoidal speed command for the case in which the speed feed-forward control using an inverse model in the first Example is disabled (FIG. 5A) and for the case in which the speed feed-forward control using an inverse model in the first Example is enabled (FIG. 5B). When the speed feed-forward control using an inverse model in the first Example was disabled, the speed error was remained diverged as illustrated in FIG. 5A. On the other hand, when the speed feed-forward control using an inverse model in the first Example was enabled, the speed error was converged as illustrated in FIG. 5B. Also from this simulation result, it is found that a speed feed-forward control using an inverse model in the first Example is effective.

Subsequently, a modified example of the first Example will be described.

As described above, a Coulomb friction of the control target 200 includes a nonlinear characteristic. In general, a nonlinear friction has the Stribeck effect which causes a stick-slip phenomenon. FIG. 6 is a diagram illustrating the Stribeck effect which causes a nonlinear friction of a control target of a motor control device. As illustrated in FIG. 6, a friction force of a motor is nonlinear near the zero-crossing of the speed of the motor. Therefore, an inverse model which is estimated for a control target including the motor may have a large error particularly near the zero-crossing. Accordingly, in the modified example of the first Example, a predetermined range of dead zone region is provided near the zero-crossing of the speed command $v_1 (=\omega(n))$ to reduce an influence of the Stribeck effect. In other words, when the absolute value of a speed command is smaller the a predetermined value σ, the inverse model calculation unit 12 maintains an inverse model which has been calculated in a sampling period before a sampling period in which the speed command is input, and outputs the inverse model to the torque correction value generating unit 13. This case is represented by the Formula 13, letting the dead zone width to σ.

$$|v_1| \geq \sigma \hat{h}_N = \hat{h}_{N-1} P_N v_N (i_N - v_N^T \hat{h}_{N-1})$$

$$|v_1| < \sigma \hat{h}_N = \hat{h}_{N-1} \qquad (13)$$

As illustrated in the Formula 13, when the absolute value of the speed command $v_1$ is smaller than the dead zone width σ, the inverse model calculation unit 12 maintains a coefficient of an inverse model without updating it and outputs the coefficient of an inverse model to the torque correction value generating unit 13. On the other hand, when the absolute value of the speed command $v_1$ is the dead zone width σ or larger, the inverse model calculation unit 12 calculates a new inverse model in accordance with the Formula 10, and outputs the new inverse model to the torque correction value generating unit 13. In the example illustrated in FIG. 6, for example, the dead zone width σ may be set to 5[rad/s].

Figure 7A:
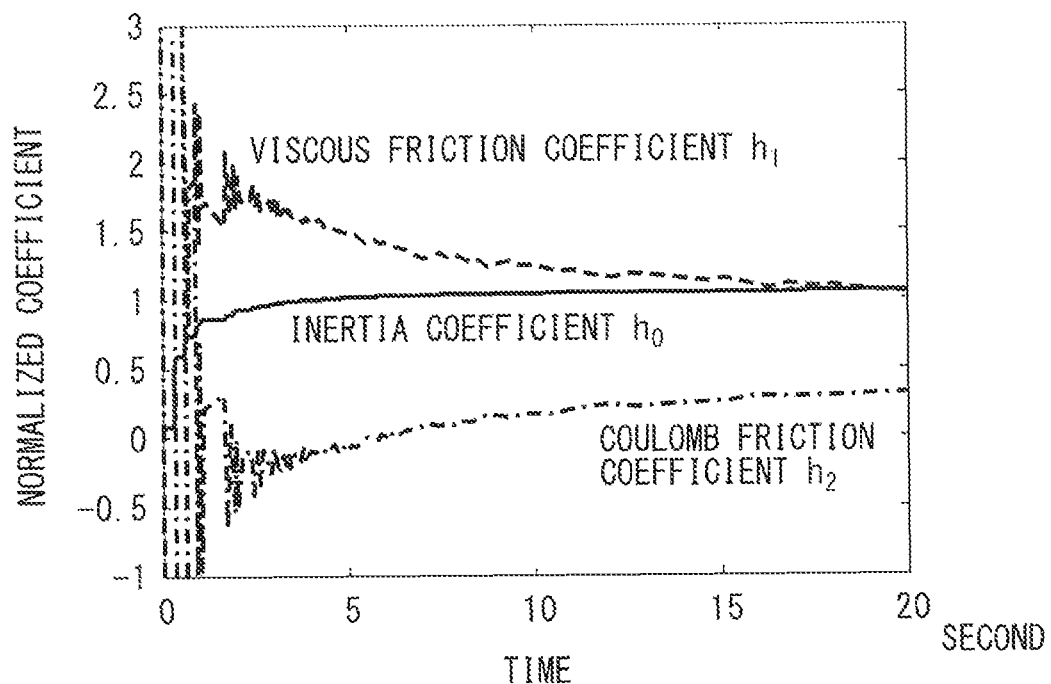
FIG. 7A is a diagram illustrating a simulation result of a motor control device according to a modified example of the first Example in which a dead zone region is not provided.
Figure 7B:
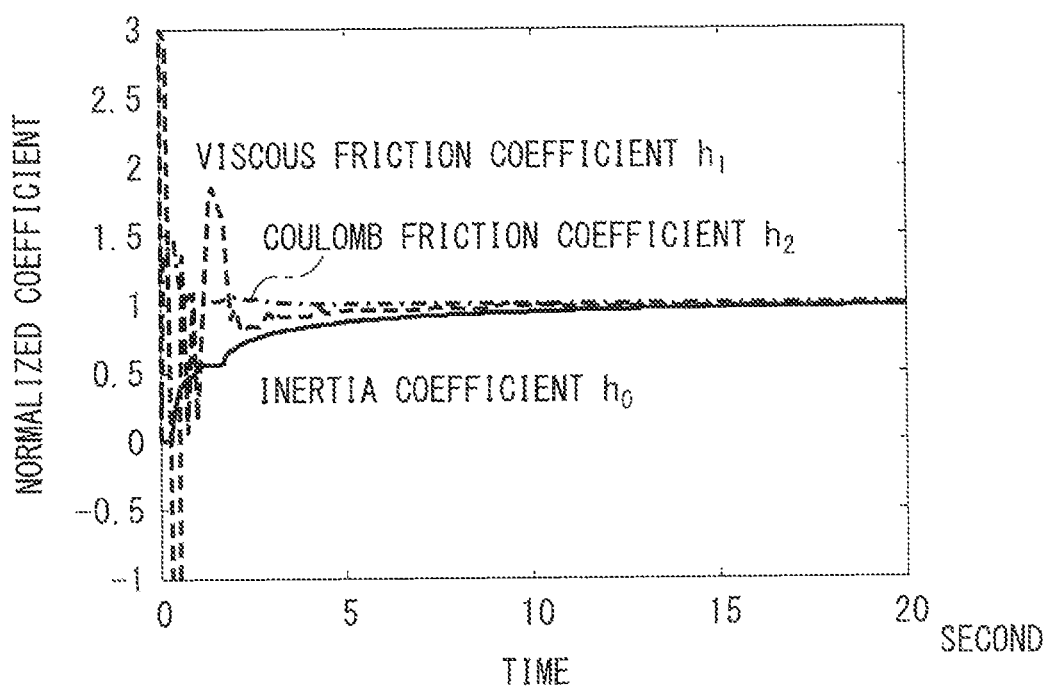
FIG. 7B is a diagram illustrating a simulation result of the motor control device according to the modified example of the first Example in which a dead zone region is provided.

FIG. 7A and FIG. 7B are diagrams illustrating simulation results of a motor control device according to a modified example of the first Example. FIG. 7A is the case in which a dead zone region is not provided, and FIG. 7B is the case in which a dead zone region is provided. A motor control device according to the above-described modified example of the first Example was modeled on a computer, and an input of an M-sequence speed command was started at 0 seconds to simulate an inertia coefficient estimation value h0, a viscous friction coefficient estimation value h1, and a Coulomb friction coefficient estimation value h2 which are coefficients of an inverse model thereafter. In FIG. 7A and FIG. 7B, the vertical axis represents the size of each of the coefficients which is normalized setting the true value as 1. Each coefficient of the inverse model converges to a true value in a shorter time in the case (FIG. 7B) in which a dead zone region is provided when compared with the case (FIG. 7A) in which a dead zone region is not provided. In the case in which a dead zone region is not provided, each coefficient remains to have a constant error and does not converge to a true value. Also from the simulation result, a speed feed-forward control using an inverse model provided with a dead zone region in the modified example of the first Example is found to be more effective.

Next, a second Example will be described. The second Example is obtained by adding a position control to the speed control of the first Example.

Figure 8:
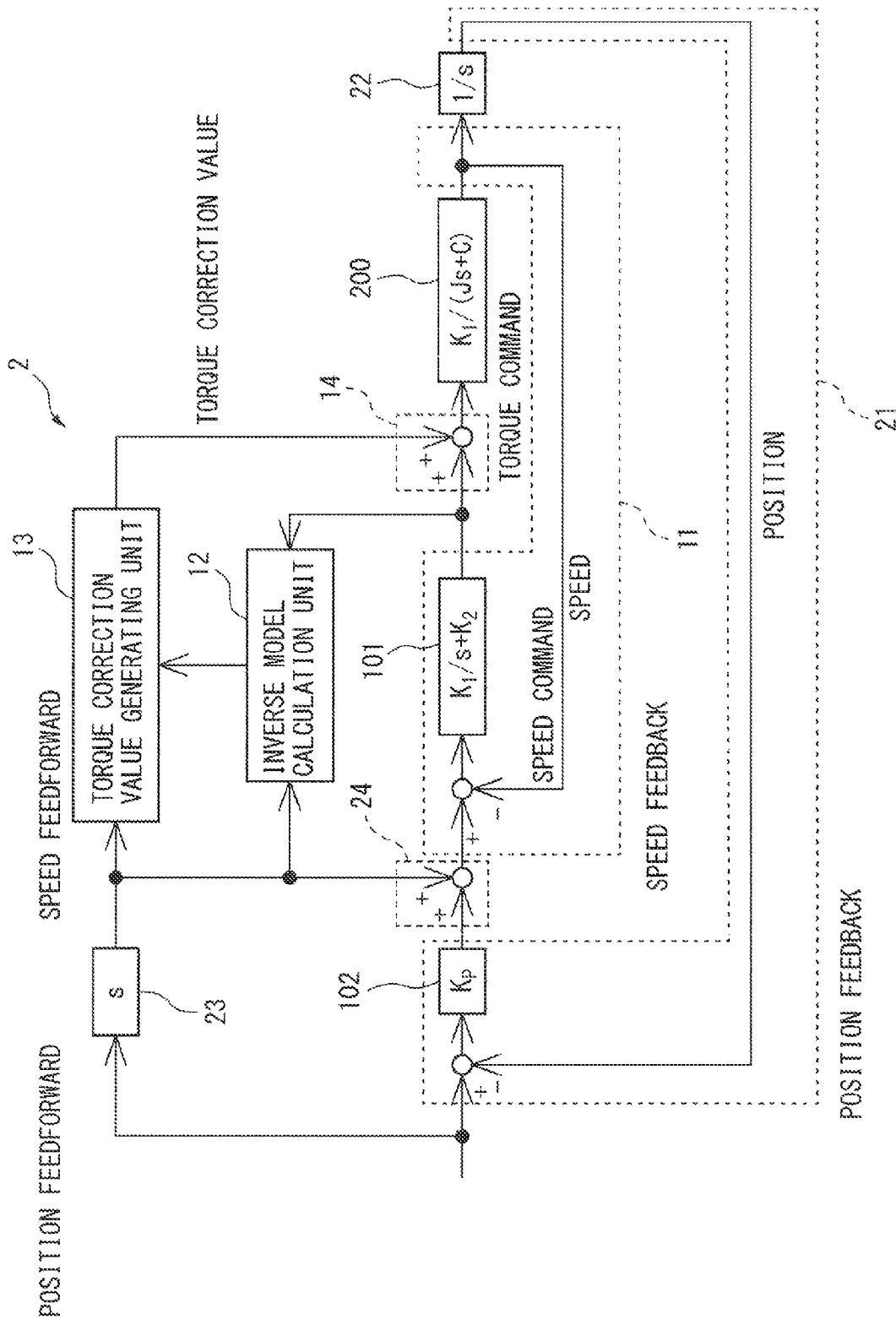
FIG. 8 is a block diagram illustrating a motor control device according to a second Example.
Figure 9:
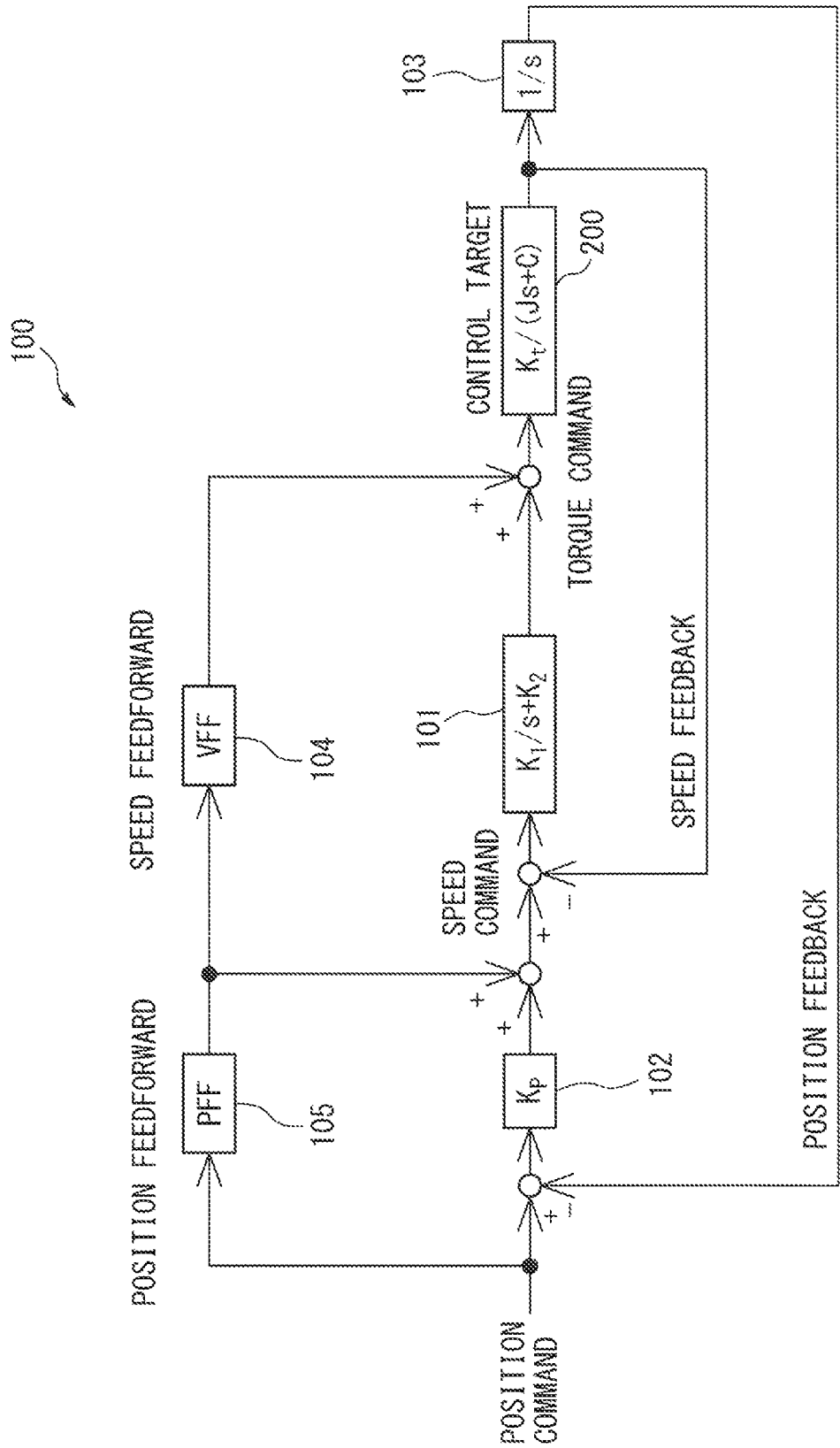
FIG. 9 is a block diagram illustrating a conventional general motor control device including a feedback control and a feed-forward control.

FIG. 8 is a block diagram illustrating a motor control device according to the second Example. The motor control device 2 according to the second Example is obtained by adding a position feedback control unit 21 comprising a position gain block 102, an integration block 22, and a position feed-forward control block 23 to the motor control device 1 of the first Example which is referred to in FIG. 1. Since other circuit components than the above are the same as in the circuit components illustrated in FIG. 1, a detailed description of the circuit components is omitted by denoting the same circuit components as the same reference numbers.

According to the second Example, the position feedback control unit 21 generates and outputs a pre-correction speed command for controlling such that the actual position of the control target 200 follows an input position command. In FIG. 8, a position gain in the position gain block 102 of the position feedback control unit 21 is set to Kp. The error between the position obtained by integrating the speed of the control target 200 by an integration block 103 and the position command is multiplied by the position gain Kp to generate a pre-correction speed command. The transfer function of the integration block 103 is represented by "1/s". The transfer function of the position feed-forward control block 23 is set to the inverse function "s" of the transfer function "1/s" of the integration block 103. In other words, the position feed-forward control block 23 differentiates an input position command. As described in the first Example, in a speed feed-forward control, an inverse model is calculated by the inverse model calculation unit 12, and a torque correction value is generated by the torque correction value generating unit 13. When an estimated inverse model is finally optimized to the inverse model of the transfer function of the control target 200, the transfer function of the speed control system described in the first Example is "1", thereby realizing a high responsiveness to a speed command. In cases in which the transfer function of the speed control system is "1", when the transfer function of the position feed-forward control block 105 is designed to the inverse function "s" of the transfer function "1/s" of the integral gain block 103, the transfer function of the position control system is also "1", thereby easily realizing a high responsiveness to the position control system.

Also in the above-described second Example, in the same manner as in the modified example of the first Example, a predetermined dead zone range is provided near the zero-crossing of the speed command to reduce the influence of the Stribeck effect.

The present invention can be applied to a motor control device comprising: a feedback control to allow a motor which is used as a driving source of a machine such as a robot, machine tool, or industrial machine to operate in accordance with a command; and a feed-forward control for increasing the responsiveness to the command.

According to the invention, a motor control device provided with a feed-forward control in which the responsiveness to a command is high can be easily optimally designed without grasping a variety of constants of the control target in detail. In other words, since the inverse model of the transfer function of a control target is calculated in accordance with a predetermined recurrence formula, a feed-forward control in which the responsiveness to a command is high can be easily optimally designed without grasping a variety of constants of the control target in detail.

Further, a motor control device provided with a feed-forward control having a high responsiveness to a command, which can be easily designed optimally without grasping a variety of constants of a control target in detail, can be realized. In other words, since the inverse model of the transfer function of a control target is sequentially estimated and the transfer function of a speed feed-forward control is sequentially changed depending on the estimated result, a high responsiveness to a command can be obtained even when inertia and friction of a control target fluctuate. Since the coefficient estimated in the inverse model calculation unit (identification device) can be utilized par se as the coefficient of the speed feed-forward, a high responsiveness to a command can be obtained even when inertia and nonlinear friction of a control target fluctuate.

Still further, an influence of the Stribeck effect which a nonlinear friction includes can be reduced by carrying out a process of the invention when a dead zone region is provided to an input speed command.

What is claimed is:

1. A motor control device for controlling a motor which drives a control target, the motor control device comprising:
   a speed feedback control unit which generates a pre-correction torque command for controlling such that an actual speed of the control target follows a speed command which is input;
   an inverse model calculation unit which calculates a coefficient of an inverse model with a transfer function inversed from a transfer function of the control target by using the speed command and the pre-correction torque command;
   a torque correction value generating unit which generates a torque correction value by using the speed command and the coefficient of the inverse model; and
   a torque command generating unit which generates a torque command for the motor which drives the control target by using the pre-correction torque command and torque correction value.

2. The motor control device according to claim 1, wherein the inverse model calculation unit comprises:
   a coefficient correction value calculation unit which calculates a coefficient correction value by using the speed command, the pre-correction torque command, and a predetermined adaptive coefficient;
   an inertia coefficient estimation value calculation unit which calculates, by using the coefficient correction value and an inertia coefficient estimation value, a new inertia coefficient estimation value;
a viscous friction coefficient estimation value calculation unit which calculates, by using the coefficient correction value and a viscous friction coefficient estimation value, a new viscous friction coefficient estimation value; and
a Coulomb friction coefficient estimation value calculation unit which calculates, by using the coefficient correction value and a Coulomb friction coefficient estimation value, a new Coulomb friction coefficient estimation value,
wherein a coefficient of the inverse model is calculated for each sampling period by using the new inertia coefficient estimation value, the new viscous friction coefficient estimation value, and the new Coulomb friction coefficient estimation value.

3. The motor control device according to claim 1, wherein, when an absolute value of the speed command is smaller than a predetermined value, the inverse model calculation unit maintains the coefficient of the inverse model calculated in a sampling period before a sampling period in which the speed command is input, and outputs the coefficient to the torque correction value generating unit.

4. The motor control device according to claim 1, wherein the torque correction value generating unit generates the torque correction value by adding:
a product of an acceleration calculated from the speed command and an inertia coefficient estimation value used for an estimation of inertia of the control target;
a product of the speed command and a viscous friction coefficient estimation value used for an estimation of a viscous friction coefficient of the control target; and
a product of a polarity of the speed command and a Coulomb friction coefficient estimation value used for an estimation of a Coulomb friction coefficient of the control target.

* * * * *